United States Patent
Aberle et al.

(10) Patent No.: US 7,247,401 B2
(45) Date of Patent: Jul. 24, 2007

(54) METHOD AND APPARATUS FOR OPERATING A FUEL CELL SYSTEM

(75) Inventors: Markus Aberle, Dettingen (DE); Joachim Blum, Deizisau (DE)

(73) Assignee: NuCellSys GmbH, Kirchheim/Tech-Nabern (DE)

( * ) Notice: Subject to any disclaimer, the term of this patent is extended or adjusted under 35 U.S.C. 154(b) by 276 days.

(21) Appl. No.: 10/255,128

(22) Filed: Sep. 24, 2002

(65) Prior Publication Data
US 2003/0077494 A1  Apr. 24, 2003

(30) Foreign Application Priority Data
Sep. 25, 2001  (DE) .................. 101 47 149

(51) Int. Cl.
*H01M 8/04* (2006.01)
(52) U.S. Cl. .................. 429/22; 700/295; 307/46
(58) Field of Classification Search .................. 429/12, 429/13, 22, 23
See application file for complete search history.

(56) References Cited

U.S. PATENT DOCUMENTS

| | | | |
|---|---|---|---|
| 5,646,852 A | 7/1997 | Lorenz et al. | 364/431.051 |
| 5,780,981 A | 7/1998 | Sonntag et al. | 318/139 |
| 6,183,895 B1 * | 2/2001 | Kudo et al. | 429/20 |
| 6,255,008 B1 * | 7/2001 | Iwase | 429/9 |
| 6,670,063 B1 * | 12/2003 | Aoyagi et al. | 429/22 |
| 6,815,100 B2 * | 11/2004 | Aoyagi et al. | 429/13 |
| 2002/0038732 A1 * | 4/2002 | Sugiura et al. | 180/65.2 |
| 2002/0039672 A1 * | 4/2002 | Aramaki | 429/22 |

FOREIGN PATENT DOCUMENTS

| | | |
|---|---|---|
| DE | 43 22 765 C1 | 6/1994 |
| DE | 195 40 824 A1 | 5/1997 |
| DE | 100 21 945 A1 | 2/2001 |
| JP | 2000-315511 | 11/2000 |
| JP | 2002-110213 | * 4/2002 |

* cited by examiner

*Primary Examiner*—Mark Ruthkosky
*Assistant Examiner*—Keith Walker
(74) *Attorney, Agent, or Firm*—Crowell & Moring LLP

(57) ABSTRACT

A fuel cell system is provided that comprises a fuel cell for powering an electrical load, an oxidant supply device for supplying oxidant to the fuel cell, an energy storage device for providing at least temporary electrical power to drive the oxidant supply device and to the electrical load, and a control device which, in response to an increased power demand from the electrical load, directs the energy storage device to provide electrical power to the oxidant supply device, and then, when an increase in fuel cell power output has been detected, directs the energy storage device to provide electrical power to the electrical load. Methods for operating the fuel cell system are also provided.

9 Claims, 2 Drawing Sheets

METHOD AND APPARATUS FOR OPERATING A FUEL CELL SYSTEM

CROSS-REFERENCE TO RELATED APPLICATION

This application claims priority based on German Patent Application No. 10147149.1 filed Sep. 25, 2001.

BACKGROUND OF THE INVENTION

1. Field of Invention

The invention relates to a method and apparatus for operating a fuel cell system and, more specifically, to a method and apparatus for operating a fuel cell system in response to an electrical power demand by an electrical load.

2. Description of the Related Art

As disclosed in German Patent No. DE 195 40 824 C2, one of the problems encountered in providing electrical power from a fuel cell is related to the supply of oxidant to the fuel cell itself. In this respect, the oxidant supply compressor may be powered exclusively by an electric motor (as in the above-mentioned patent document), or may be powered by an expander, which expands exhaust gases that have been generated in the fuel cell and utilizes the resulting recovered thermal energy to drive the compressor. The latter design is known, for example, from German Patent No. DE 197 55 116 C1.

A disadvantage of such systems is that the power needed by the compressor is generated by the fuel cell itself, either as electrical power or as energy recovered from the exhaust gases. This creates a problem with regard to the dynamic response, as the fuel cell is not able to immediately provide increased electrical energy since the necessary increase in oxidant volume must first be provided to the fuel cell by the compressor.

To address this dynamic response limitation, it has generally been accepted to use an electrical energy storage device to provide the temporary energy shortfall to the electrical load that is demanding a certain target power. In a motor vehicle, such demand is typically based on the position of the accelerator pedal. For motor vehicle applications, this means that it is necessary to employ electrical storage devices, such as batteries, which are able to provide comparably high power and a correspondingly high amount of energy. Batteries of this nature are typically very large and heavy, which is a significant drawback in motor vehicle applications in terms of weight and space requirements.

Accordingly, there is a need in this field for a method and apparatus for operating a fuel cell system in response to an electrical power demand by an electrical load that overcomes the above-mentioned dynamic response limitation. The present invention fulfills this need and provides further related advantages.

BRIEF SUMMARY OF THE INVENTION

A method is provided for dynamic operation of a system having a fuel cell for powering an electrical load, an energy storage device and an oxidant supply device for supplying oxidant to the fuel cell. In response to an increased electrical power demand from the electrical load, the method comprises providing electrical power from the energy storage device to drive the oxidant supply device, and then, when an increase in the fuel cell power output has been detected, providing electrical power from the energy storage device to the electrical load. Electrical power may or may not be supplied from the energy storage device to the electrical load before the increase in the fuel cell power output has been detected. When the increase in the fuel cell power output has been detected, the electrical power provided from the energy storage device to the oxidant supply device may be reduced.

The amount of power provided by the energy storage device to the load compensates the power shortage between the electrical power demand of the electrical load and power available from the fuel cell to the electrical load.

A fuel cell system is also provided that comprises a fuel cell with an oxidant supply device and an electrical storage device. The system is configured so that both the electrical storage device and the fuel cell can supply power to drive the oxidant supply device and an electrical load, such as a traction motor. In response to an increased power demand from the electrical load, a control unit directs the energy storage device to provide electrical power to the oxidant supply device, and then when a certain increase in the fuel cell power output has been detected, directs the energy storage device to provide power to the electrical load. The control device can also reduce the electrical power provided from the energy storage device to the oxidant supply device, when a certain increase in the fuel cell power output has been detected. The control device can control the amount of power provided by the energy storage device to the load to compensate the power shortage between the electrical power demand of the electrical load and power available from the fuel cell to the electrical load. Suitable electrical storage devices include, for example, batteries, supercapacitors or combinations of these or other devices.

Specific details of certain embodiments of the invention are set forth in the detailed description below to provide a thorough understanding of such embodiments. One skilled in the art, however, will understand that the present invention may have additional embodiments, or may be practiced without several of the details described.

DETAILED DESCRIPTION OF THE INVENTION

Figure 1:
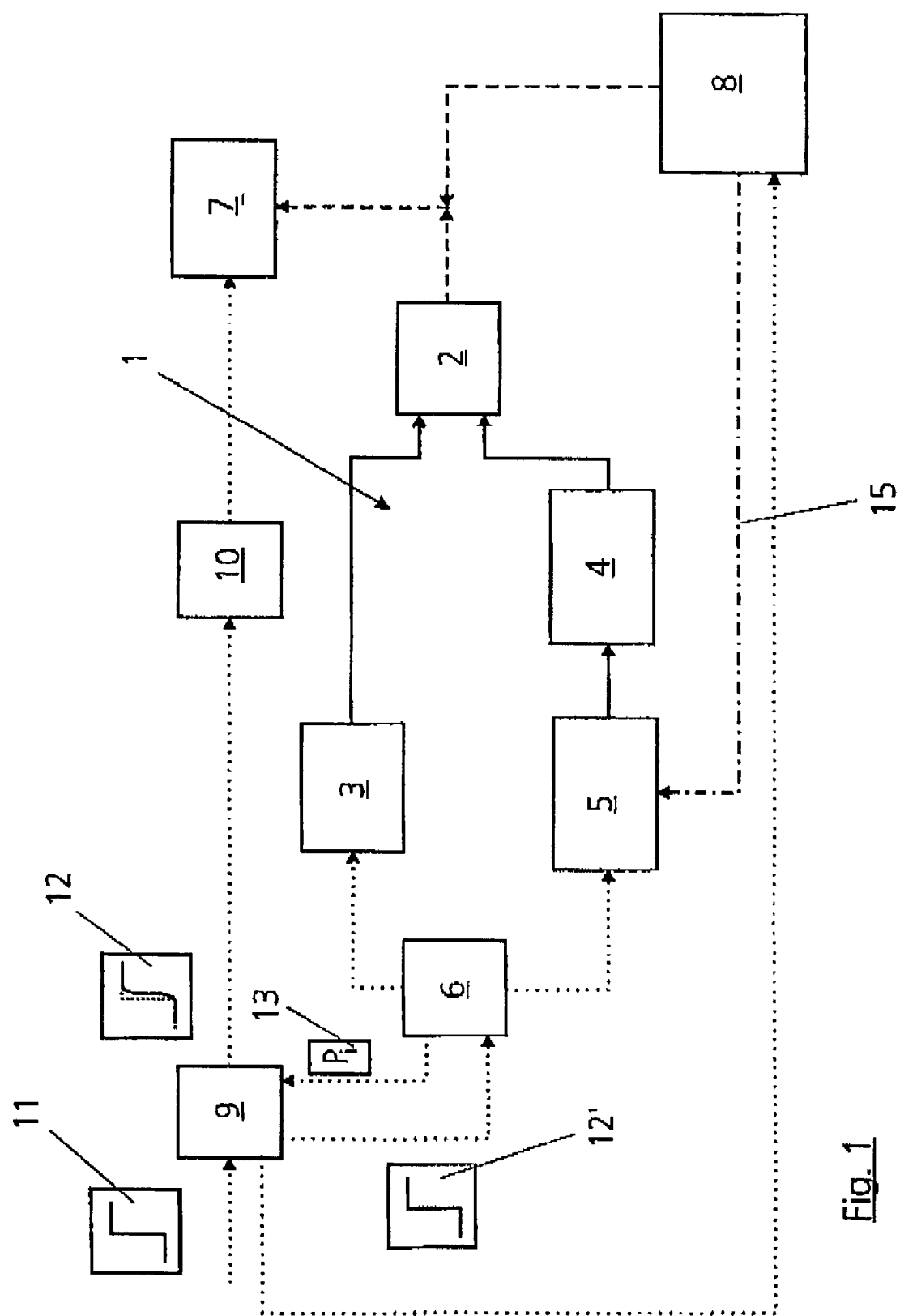
FIG. 1 shows a schematic representation of a fuel cell system comprising a fuel cell, an energy storage device and various control units.

FIG. 1 shows a schematic representation of a fuel cell system 1 comprising a fuel cell 2, which may be a PEM fuel cell, and a fuel processing system 3. In a manner known in the art, fuel cell 2 is supplied with hydrogen-containing gas by fuel processing system 3 (or fuel cell 2 may be supplied with substantially pure hydrogen from a hydrogen supply). In addition, fuel cell 2 is supplied with an oxygen-containing gas (e.g., air) by a compressor 4, which is driven by a drive 5 that comprises an electric motor. Fuel cell system 1 is controlled and regulated by a fuel cell control unit 6 through schematically indicated control or signal lines, which in FIG. 1 are shown as dotted lines. Electrical energy generated by fuel cell 2 is supplied via electrical lines, which are shown as dashed lines in FIG. 1, to an electric motor 7, which is responsible for the traction drive of the motor vehicle equipped with this system. If fuel cell 2 produces excess power, then this power is supplied to an energy storage device 8. Energy storage device 8 may be a battery. It is also possible to employ a supercapacitor or a combination of a supercapacitor and a battery, so that very high currents can be temporarily stored in the supercapacitor and can then be made available to the system very rapidly with significantly smaller losses, or can be stored in the battery using a lower current over a longer period of time. The vehicle is controlled by a vehicle control unit 9, which communicates with fuel cell control unit 6 and a motor control unit 10 through corresponding control lines.

The following describes the behavior of the overall system around fuel cell system 1 in the case of a dynamic demand for an increase in output power. Cause for such an output increase is usually a demand by the accelerator pedal, which in the most dynamic case occurs as a step change in the power requirement, as is indicated by the accelerator pedal demand labelled 11. Since such a stepped power increase would result in a jolting motion of the vehicle, vehicle control unit 9 converts this accelerator pedal demand 11 into a target power demand 12, which may for example be specified to motor control unit 10 as a target torque. Motor control unit 10 then transmits to electric motor 7 the required motor current to provide this target torque. At the same time, target power demand 12 is transmitted to fuel cell control unit 6, for example as a target fuel cell output current 12'. Fuel cell control unit 6 controls fuel cell system 1 accordingly, in order to provide the current required for electric traction motor 7 as soon as possible.

For this purpose, fuel cell control unit 6 returns to vehicle control unit 9 the available instantaneous current, which corresponds to an available power ($P_i$) 13. This available current or available power 13 in general is lower than required target power demand 12. Vehicle control unit 9, and possibly fuel cell control unit 6 (the communication is not illustrated in FIG. 1), communicate accordingly with energy storage device 8 through a corresponding control line. Energy storage device 8 makes available the required power difference, so that electric traction motor 7 is supplied with the total required motor current from fuel cell system 1 and energy storage device 8 combined, and the vehicle is able to respond promptly to accelerator pedal demand 11.

Figure 2:
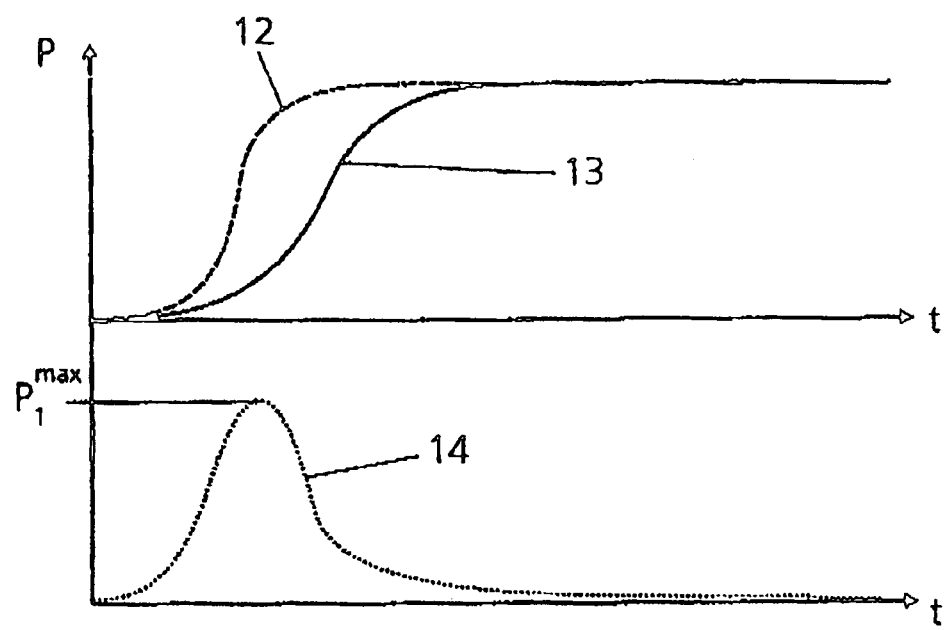
FIG. 2 shows various power levels, as a function of time, which occur in response to a change in load demand in a conventionally operated fuel cell system.

By comparing power (P) as a function of time (t), FIG. 2 illustrates this sequence (which represents the existing state of the art). In the top part of FIG. 2 the dotted line represents the target power demand 12, while the solid line represents available power 13 that can be provided by fuel cell 2. The difference between the two, which is represented by the area between the two lines (12, 13), is covered by power 14 from energy storage device 8 that is shown in the lower part of FIG. 2, so that overall the system is able to meet target power demand 12. However—as shown in FIG. 2—this means that energy storage device 8 must provide a relatively high maximum power $P_1^{max}$. The amount of energy provided by energy storage device 8 (i.e., the area under power curve 14) is also relatively large.

According to the present invention, an electrical connection 15 is located between energy storage device 8 and drive 5 of compressor 4, which is shown as a dash-dot line in FIG. 1. Upon receiving increased accelerator pedal demand 11, vehicle control unit 9, and potentially also fuel cell control unit 6, directs current from energy storage device 8 to drive 5 of compressor 4 (via electrical connection 15). This power surge "jump-starts" compressor 5, and thus ensures a rapid supply of air to fuel cell 2. This allows fuel cell 2 to start or increase its power output much more rapidly and provide sufficient power 13 for driving electric traction motor 7 much earlier.

Figure 3:
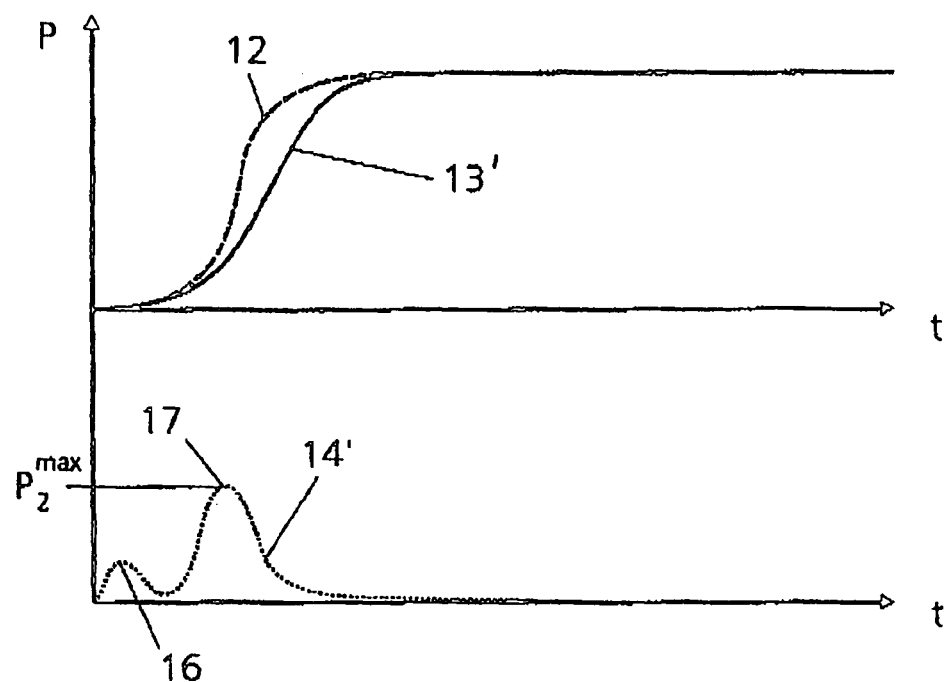
FIG. 3 shows various power levels, as a function of time, which occur in response to a change in load demand in the fuel cell system of FIG. 1 that is operated using an embodiment of the present method.

As illustrated in FIG. 3, target power as a function of time is shown as dotted line 12, while available power that fuel cell 2 can provide (as a function of time) is indicated by solid line 13'. Curve 14' represents power output from energy storage device 8 when fuel cell system 1 is operated using an embodiment of the present method. Once increased accelerator pedal demand 11 is detected (by vehicle control unit 9), a power burst 16 is released from energy storage device 8 to drive 5 of compressor 4.

As soon as available power 13 from fuel cell 2 starts to increase, the power provided from energy storage device 8 to drive 5 of compressor 4 is reduced. This energy/power burst 16 to the air supply results in a more rapid dynamic response of fuel cell 2, as the conduits of fuel processing system 3 typically contain enough reformate or hydrogen-rich gas to be able to adequately supply fuel cell 2 with fuel. As soon as fuel cell 2 increases its delivery of power, the conventional method described above is used—that is, the power shortage between target power demand 12 and available power 13' is compensated by energy storage device 8, in the form of a second power burst 17, delivered this time to electric traction motor 7.

Because fuel cell 2 delivers increased power much more rapidly in response to target power demand 12, the amount of energy required from energy storage device 8 (i.e., the area between curves 12 and 13') is smaller when compared to the area between curves 12 and 13 of the conventional method. In addition, the time lag between power peaks 16 and 17 results in maximum power $P_2^{max}$ demanded from energy storage device 8 being smaller. As a result, the maximum current demanded from energy storage device 8 is also smaller.

This makes it possible to design energy storage device 8 with smaller specifications regarding its energy content and its maximum deliverable power $P^{max}$ when compared with an energy storage device in a fuel cell system 1 configured and operated conventionally. This allows the use of a smaller, lighter, and significantly cheaper energy storage device in motor vehicle applications, thus positively affecting price, weight, driving performance, and the space requirements for energy storage device 8.

While particular elements, embodiments and applications of the present method and apparatus have been shown and described herein, it will be understood that the invention is not limited thereto since modifications may be made by those skilled in the art, particularly in light of the foregoing teachings. It is therefore contemplated by the appended claims to cover such modifications as incorporate those features that come within the scope of the invention.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

What is claimed is:

1. A method for operating a system having a fuel cell for powering an electrical load, an energy storage device and an oxidant supply device, the method comprising:
   detecting a demand for an increase in output power of the fuel cell to the electrical load;
   in response to a detected demand for an increase in power output, providing electrical power from the energy storage device to drive the oxidant supply device while the fuel cell is supplying power to the electrical load;

detecting an increase in power output of said fuel cell; and when an increase occurs in power output of the fuel cell to the electrical load, interrupting the supply of electric power from the energy storage device to the oxidant supply device, and commencing thereafter providing electrical power from the energy storage device to the electrical load in an amount which covers a difference between said increase in power output of said fuel cell and said demanded increase in power output of said fuel cell.

2. The method of claim 1 wherein the amount of electrical power provided by the energy storage device to the electrical load is controlled by a control device to compensate for a power shortage between the electrical power demand of the electrical load and power available from the fuel cell to the electrical load.

3. The method of claim 1 wherein each of said steps of providing electrical power from the energy storage device comprises providing electrical power from a battery.

4. The method of claim 1 wherein each of said steps of providing electrical power from the energy storage device comprises providing electrical power from a supercapacitor.

5. A fuel cell system comprising:
   a fuel cell for powering an electrical load;
   an oxidant supply device for supplying oxidant to the fuel cell;
   an energy storage device for providing at least temporary electrical power to drive the oxidant supply device and to the electrical load; and
   a control means for,
   i) detecting a demand for an increase in output power from the fuel cell to the electrical load;
   ii) in response to a detected demand for such an increase, causing the energy storage device to provide electrical power to drive the oxidant supply device while the fuel cell is supplying power to the electrical load;
   iii) detecting an increase in power of the fuel cell to the electrical load; and
   iv) when an increase occurs in power output of the fuel cell to the electrical load, interrupting the supply of electric power from the energy storage device to the oxidant supply device, and causing the energy storage device to provide electrical power to the electrical load, in an amount which covers a difference between said increase in power output of said fuel cell, and said demanded increase in power output of said fuel cell.

6. The system of claim 5 wherein, when the increase in the fuel cell power output has been detected, the control means reduces the electrical power provided from the energy storage device to the oxidant supply device.

7. The system of claim 5 wherein the control device controls the amount of electrical power provided by the energy storage means to the electrical load to compensate for a shortage between the electrical power demand of the electrical load and power available from the fuel cell to the electrical load.

8. The system of claim 5 wherein the electrical storage device is a battery.

9. The system of claim 5 wherein the electrical storage device is a supercapacitor.

* * * * *